United States Patent [19]

Klauser

[11] 4,095,157

[45] June 13, 1978

[54] DIGITAL SERVOMECHANISM CONTROL SYSTEM

[75] Inventor: John G. Klauser, Holliston, Mass.

[73] Assignee: Boston Digital Corporation, Hopkinton, Mass.

[21] Appl. No.: 721,318

[22] Filed: Sep. 7, 1976

[51] Int. Cl.² ............................................. H02P 5/00
[52] U.S. Cl. ...................................... 318/603; 318/685
[58] Field of Search ............... 318/685, 696, 601, 603, 318/162

[56] References Cited

U.S. PATENT DOCUMENTS

| | | | |
|---|---|---|---|
| 3,512,060 | 5/1970 | Floyd | 318/616 X |
| 3,579,279 | 5/1971 | Inaba et al. | 318/696 |
| 3,749,995 | 7/1973 | Leenhouts | 318/570 |
| 3,963,971 | 6/1976 | Leenhouts et al. | 318/696 |

Primary Examiner—Robert K. Schaefer
Assistant Examiner—John J. Feldhaus
Attorney, Agent, or Firm—Amster & Rothstein

[57] ABSTRACT

A digital control system is provided for regulating the position and velocity of a load. Within the control system, both commanded and actual motion of the load are represented by a bi-directional pulse train in which each pulse represents an increment of movement, so that the pulse repetition rate represents the speed of the load. A bi-directional pulse generator is provided in which the polarity and repetition rate of the output signal are dependent respectively on the sign and magnitude of the differential pulse accumulation between the commanded and actual motion signals. In one embodiment, a pulse-actuated incremental stepping motor is used to move the load, so that the bi-directional pulse train from the pulse generator can be applied directly to the stepping motor through a pulse conditioner, and is also fed back through a single feedback connection as the actual motion signal. In a second embodiment of the system, a motor requiring an analog drive signal is used and the system has two feedback paths for a bi-directional pulse signal produced by a transducer in response to the actual movement of the load. In the first path, there is accumulated the difference between the number of pulses in the transducer signal and the number of pulses in an externally applied command signal to produce a positional error signal. The positional error signal is applied to a pulse generator to control the polarity and repetition rate of bi-directional output pulses produced by the pulse generator. The output pulses from the pulse generator are used as the command signal for the second feedback path in which there is accumulated the difference between the number of pulses in the pulse generator signal and the transducer signal to produce a second error signal. The second error signal is applied to a digital-to-analog converter which provides an analog signal for controlling the speed of the motor that moves the load. In a third embodiment, a plurality of subsystems, each of the type described above, are combined to form a system for controlling the position and motion of the load along a plurality of coordinates.

14 Claims, 9 Drawing Figures

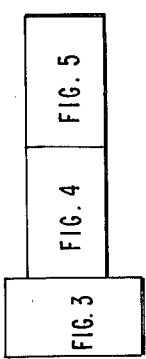
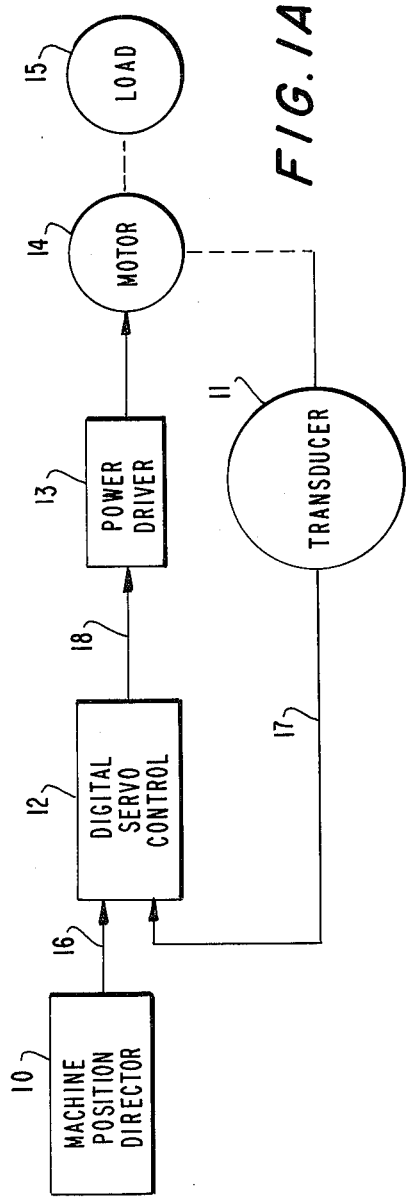
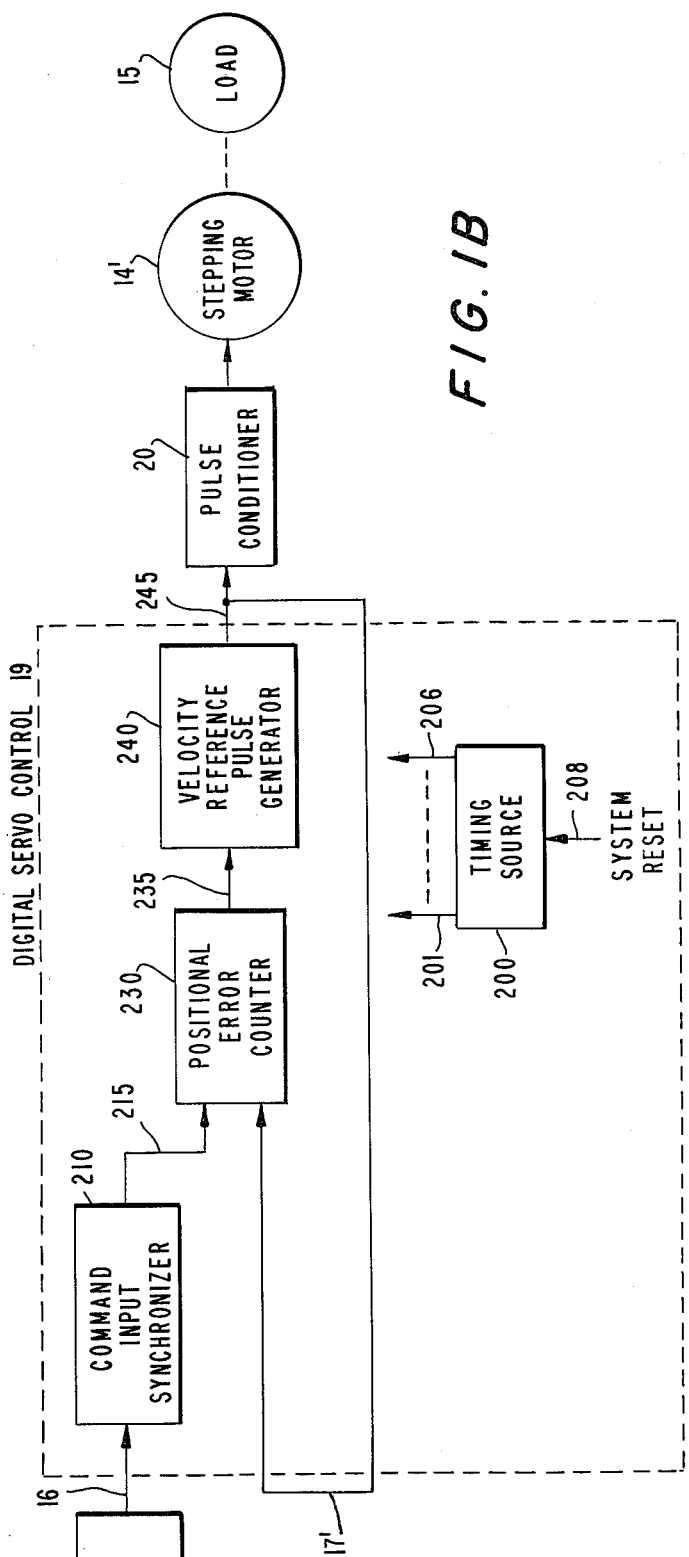

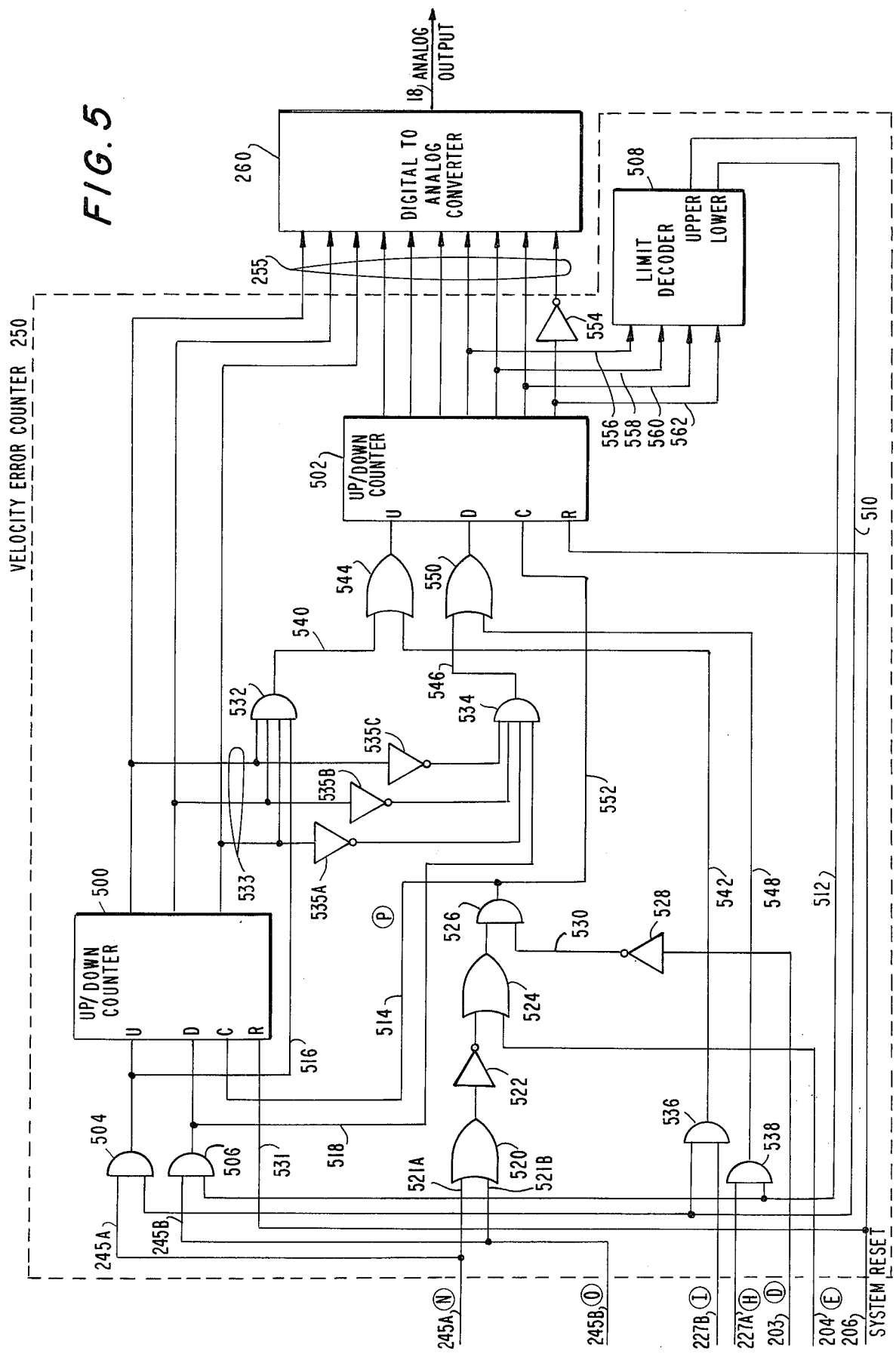

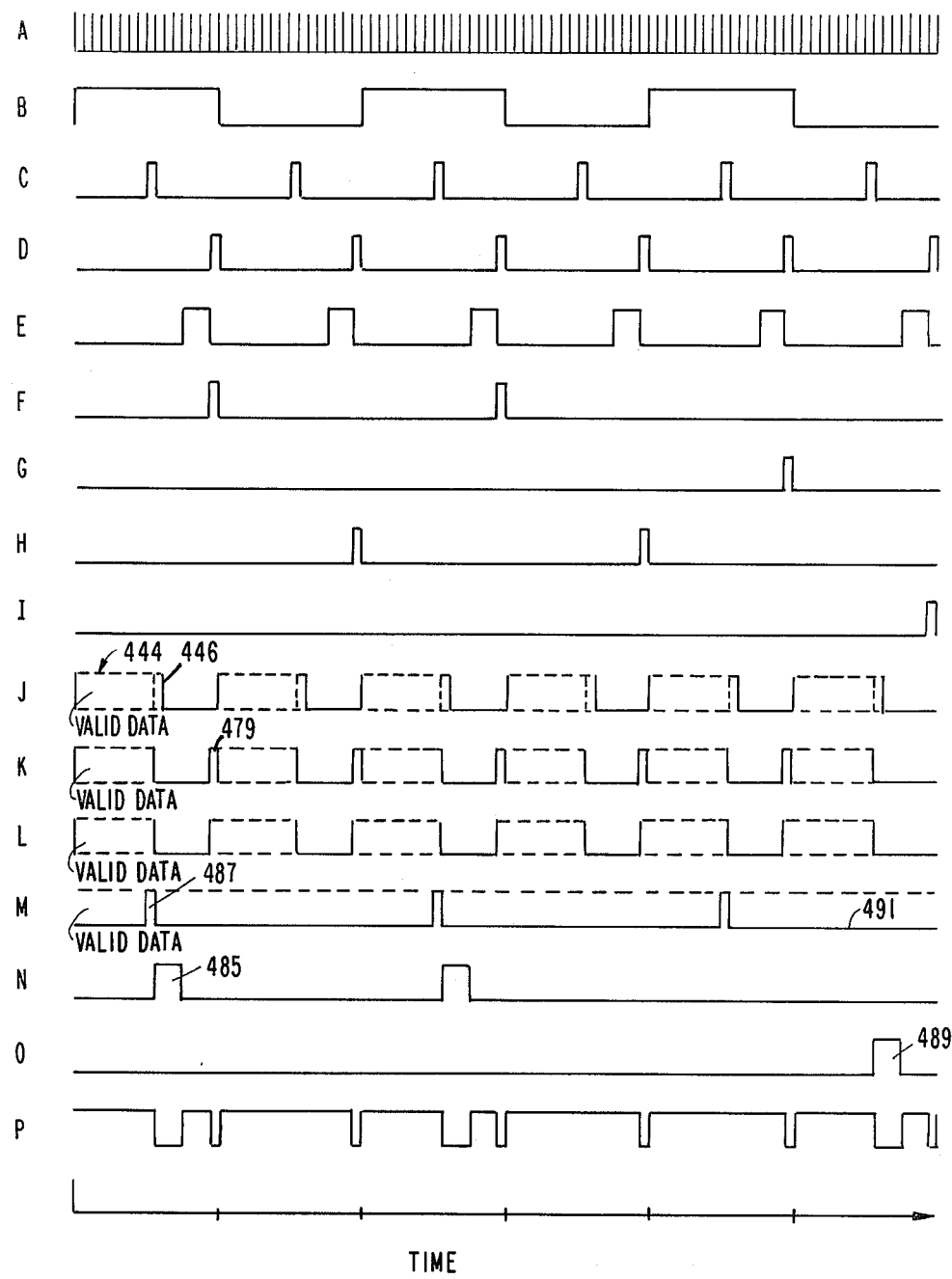

DIGITAL SERVOMECHANISM CONTROL SYSTEM

This invention relates generally to servomechanism control systems, and in particular to a method and apparatus employing digital techniques for the precise regulation of position and motion in a servomechanism.

Servomechanism control systems have long been used for the accurate control of motion or position of a load. Typically, such systems maintain close accuracy by keeping the rate of motion of the load (e.g., velocity) proportional to the distance between actual and desired position. For example, U.S. Pat. No. 3,241,015 issued to F. K. Allen on Mar. 15, 1966 discloses a positional control system which has two feedback paths. In this system, an analog signal representing the desired position of the load is provided from a positional reference signal source and a positional pickoff provides an analog signal representing the actual position of the load. These desired position and actual position signals are then subtracted to produce a positional error signal which is processed in a function generator to produce a signal representing the desired velocity of the load. A rate signal generator or tachometer, which is coupled to the load, provides a signal representing the actual velocity of the load and this actual velocity signal is subtracted from the desired velocity signal to produce a velocity error signal. This velocity error signal is then amplified and applied to a driving arrangement or motor which moves the load.

Although control systems are available for accurately controlling the position and movement of a load, these systems possess certain disadvantages which are undesirable in systems of this type. For example, it would be preferable not to have a tachometer. Tachometers are precision electromechanical devices and tend to be relatively expensive. In addition, tachometers must be precisely mounted to the motor or load in order to produce accurate actual velocity signals. Also, tachometers exhibit undesirable ripple effects in operation, and tend to have speed related nonlinearities.

Further disadvantages in existing systems result from the systems being analog. That is, all of the signals are of a continuously variable amplitude, and control information is carried in the amplitude of the signals. As is well known, amplitude dependent systems are particularly susceptible to noise, especially noise generated outside the control loop. In control systems of the type described, the motor is repeatedly accelerated and decelerated, and its transients produce undesirable noise which can detrimentally affect the accuracy of positioning or motion. Furthermore, since the accuracy of the control system depends on the amplitude of the various signals, it is necessary to maintain a close correspondence between the amplitude of the positional reference signal and the desired position, and to assure that the signal driving the motor achieves a null when the positional reference signal corresponds to the actual position signal. Unfortunately, the desired accuracy cannot be maintained for any extended period of time because the variations of internal components with environmental conditions and age affect signal amplitudes. As a result, adjustments are often necessary for calibration. In addition, when a defective component is replaced with a new one, it is often necessary to retune the entire system. Furthermore, in a multi-coordinate system a dual loop control system of the type described is required for each coordinate and it is necessary to calibrate the movement along each coordinate with respect to every other coordinate so that desired relative motion is achieved along all coordinates. Thus, in a multi-coordinate system, the sub-system for each coordinate must be calibrated not only within itself, but with the sub-system corresponding to every other coordinate. As a result, the calibration problem in a multi-coordinate system becomes even more severe.

In an attempt to overcome the disadvantages of analog systems, control systems have been provided in which signals representing both the desired motion and the actual motion of the load are pulse signals. For example, in U.S. Pat. No. 3,828,168 issued on Aug. 6, 1974 to G. F. O'Callahan, the motion of the load is represented by a pulse train in which each pulse represents an incremental change of position of the load, so that the frequency of the pulse train is indicative of velocity of the load. According to the O'Callahan patent, a commanded motion signal having this format is provided by a reference frequency generator, and is converted to an analog commanded motion signal by means of a digital-to-analog converter. The control system includes two parallel feedback paths. The first path includes a combination up/down counter and digital-to-analog converter which is differentially responsive to the digital commanded motion signal and a digital signal representing the actual motion of the load; this path produces an analog positional error signal. The second path includes compensation circuits which are differentially responsive to the analog commanded motion signal and a signal (provided by a tachometer) which represents the actual velocity of the load; this path produces an analog velocity error signal. The analog commanded motion signal, analog positional error signal, and analog velocity error signal are then all combined and the resulting combined signal is applied, through an amplifier, as a drive to the motor which moves the load. Although this system eliminates the problem of having to calibrate the amplitude of the positional reference signal source by providing a digital commanded motion signal from a reference frequency generator, it still requires the addition of three analog signals. Two of these signals come from digital-to-analog converters, which provide substantially consistent and stable analog signals. However, the compensation circuits which provide the velocity error signal and the circuit which adds the three analog signals together include conventional analog components, and are subject to the aforementioned variations with time and environment, so that calibration will be necessary. Furthermore, this system still requires the use of a tachometer, with all the attendant disadvantages mentioned above.

Broadly, it is an object of this invention to provide a system for accurately controlling the position and velocity of a load, which system eliminates one or more of the disadvantages inherent in existing systems of this type. In particular, it is within the contemplation of this invention that digital techniques be employed to eliminate one or more disadvantages inherent in existing control systems of the type described.

It is another object of this invention to control accurately the position and velocity of a load without using an analog transducer to determine the actual velocity of the load.

It is an object of this invention to provide a system for accurately controlling the position and velocity of a load in which system digital techniques are employed to eliminate the requirement for a tachometer.

It is an object of this invention to provide a system for controlling the position and velocity of a load, which system is substantially unaffected by changes in environmental conditions encountered in a typical industrial environment.

It is a further object of this invention to provide a system for accurately controlling the position and velocity of a load, the performance of which system will remain substantially constant over an extended period of time.

It is yet another object of this invention to eliminate the requirement for frequent calibration and adjustment in a system for accurately controlling the position and velocity of a load.

It is a further object of this invention to employ digital techniques in order to control accurately the position and velocity of a load with respect to a plurality of coordinates.

It is yet another object of this invention to provide a system for accurately controlling the position and velocity of a load, which system satisfies the overall requirements of such a system including reliability under continuous use, compactness, simplicity of design and economy of construction.

In accordance with the invention, there is provided a digital control system for regulating both position and velocity of a load along a single coordinate. A bi-directional pulse generator having a controllable output pulse polarity and repetition rate is provided in a control system in which both desired and actual motions of the load are represented as bi-directional pulse signals. The polarity and repetition rate of the pulse generator output signals are dependent, respectively, on the sign and magnitude of the differential pulse accumulation between the desired and actual motion signals. The pulse generator output signal is used as an effective commanded motion signal which, after additional processing, is applied to the motor which moves the load.

In accordance with one illustrative embodiment of the invention, the motor which moves the load is an incremental stepping motor which imparts a predetermined increment of movement each time it receives an actuating pulse. The pulses from the pulse generator are provided as actuating pulses to the stepping motor through a pulse conditioner and are also fed back as the actual motion signal.

In accordance with a second embodiment of the invention, useful when the motor which moves the load must be actuated by an analog signal, the system has two feedback paths for the bi-directional pulse signal derived from a digital transducer which responds to the actual movement of the load. In the first path, an up-/down counter, differentially responsive to the transducer signal and to an externally applied command signal, produces a positional error signal which is applied to a pulse generator to control the polarity and repetition rate of bi-directional output pulses produced by the pulse generator. The output pulses from the pulse generator are used as the command signal for the second feedback path and they are applied, along with the transducer signal, to a second up/down counter, which produces a second error signal. The second error signal is applied to a digital-to-analog converter, which provides an analog signal for conrolling the drive power and, thereby, the speed of a motor that moves the load.

In a third embodiment of the invention, a plurality of subsystems are combined to form a system for controlling the position and motion of the load along a plurality of coordinates. Each of the control subsystems is dedicated to controlling the position and motion with respect to a different one of the coordinates, and all of the control subsystems are operated from a common master oscillator or clock pulse source which automatically calibrates the control signals along the various coordinates with respect to each other.

The foregoing brief description as well as further objects, features and advantages of the present invention will best be understood by reading the following detailed description of presently preferred, but nonetheless illustrative, embodiments of the present invention and referring to the drawing in which:

FIG. 1A is a functional block diagram showing a single coordinate servomechanism control system incorporating objects and features of the invention;

FIG. 1B is a functional block diagram of one embodiment of the invention depicting an entirely digital control system employing a pulse actuated incremental stepping motor to move the device under control;

Figure 2:
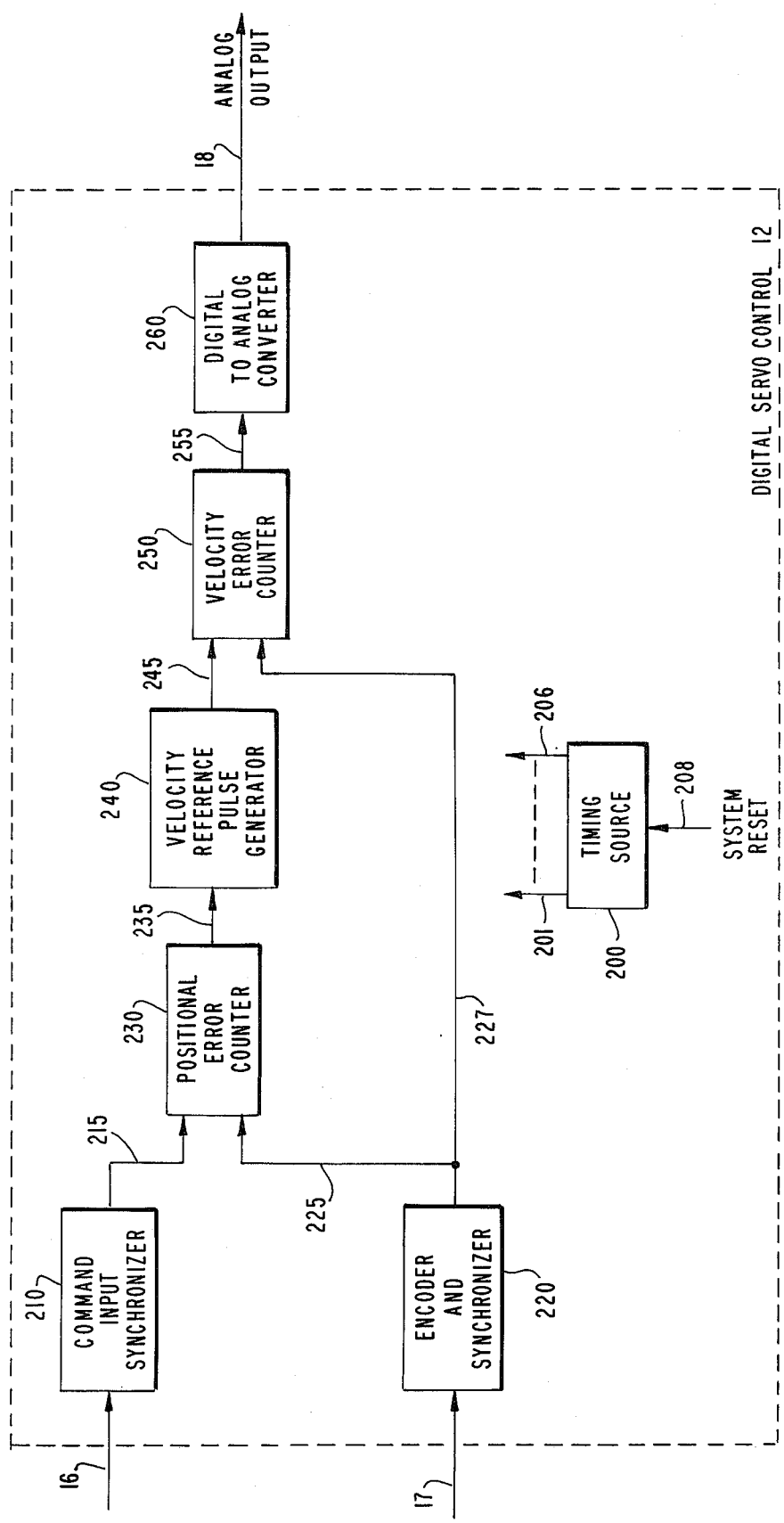
FIG. 2 is a functional block diagram of a second embodiment of the invention showing further details of the digital servo control 12 of FIG. 1A.
Figure 3:
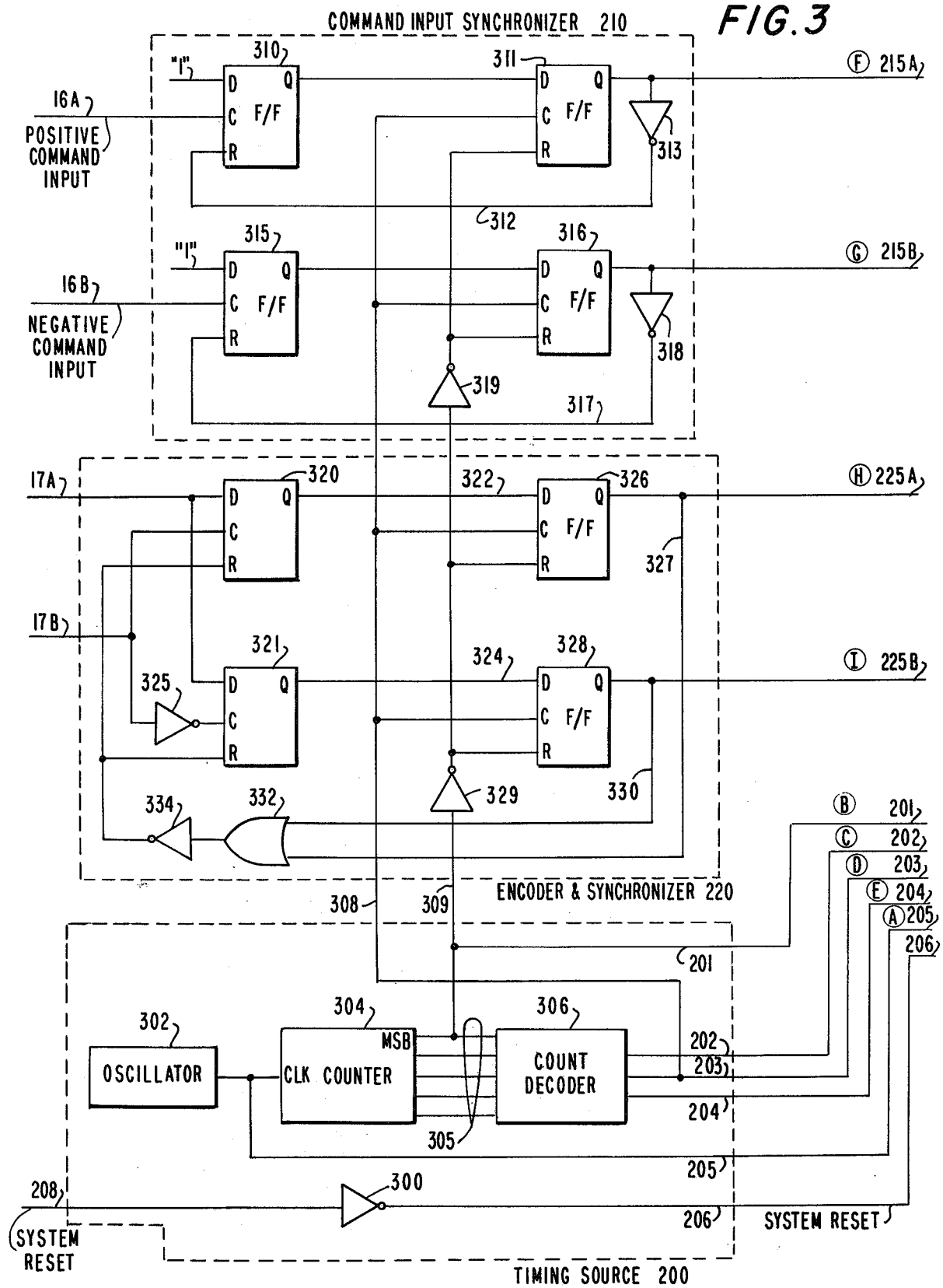
Figure 4:
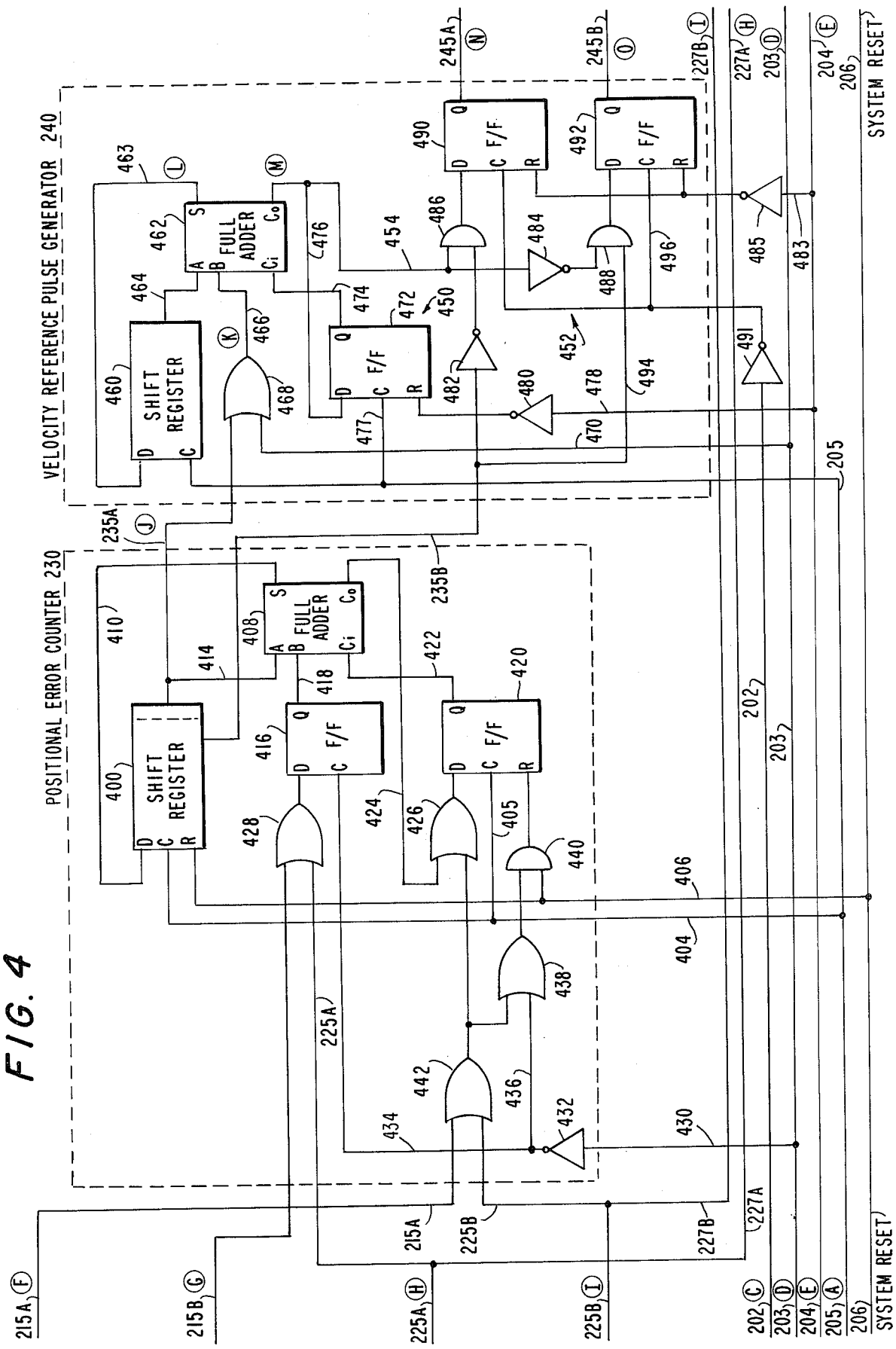
Figure 8:
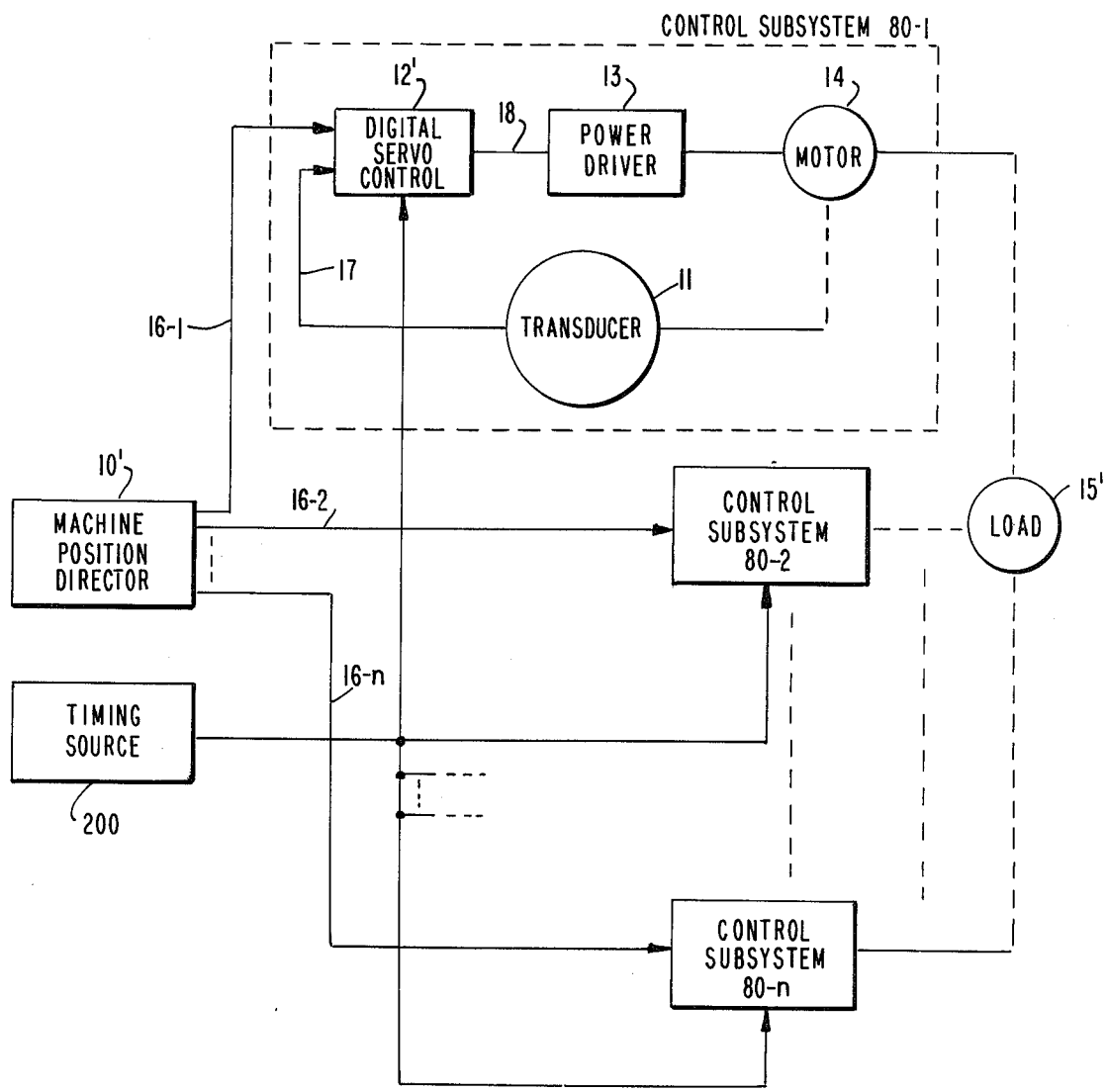

FIGS. 3, 4 and 5, when arranged as shown in FIG. 6, provide a logic schematic diagram of the embodiment of the invention illustrated in FIG. 2;

FIG. 7 is a waveform diagram, keyed to the logic schematic diagram, which is useful in explaining the operation of the invention as illustrated by the schematic diagram;

FIG. 8 is a functional block diagram illustrating a third embodiment of the invention useful in a multiple coordinate control system.

Referring now to the details of the drawings, FIG. 1A depicts the general structure of a system for controlling the position and motion of a load in accordance with the invention. The system includes: machine position director 10 which provides a commanded motion signal representative of the desired motion of a load; transducer 11 which is coupled to sense the actual motion of the load and produces a signal representing the actual motion; digital servo control 12, which is a network jointly responsive to the commanded motion signal from position director 10 and actual motion signal from transducer 11 to control a motor 14 through a power driver 13; and motor 14 which is effective to move the load 15.

Machine position director 10 is a controller of conventional design, such as a numerical control for a machine tool. It produces a bi-directional pulse train in which each pulse represents a desired incremental change in the position of the load and the polarity of the pulse determines in which of two possible directions the change in position will occur. From the foregoing, it will be appreciated that the repetition rate for pulses corresponds to the desired speed of movement of the load, while the pulse polarity indicates the direction of movement.

Transducer 11 may be any form of conventional transducer which converts the rotation of motor 14 to a digital signal. For example, one type of transducer commonly used for this purpose includes a disc coaxially mounted for rotation with the shaft of motor 14. The disc includes in its circumference a plurality of equally spaced apertures with the spacing between apertures equal to the size of an aperture. A pair of light sensors are mounted in circumferentially spaced relationship behind the disc and a light source is directed at the front of the disc. Thus, as the disc rotates each light sensor is alternately illuminated, as an aperture passes, and darkened, when covered by a solid portion of the disc. As a result, each light sensor produces a square wave having a frequency dependent on the speed of rotation of the disc, which rotates with the motor shaft. Inasmuch as the two light sensors are spaced circumferentially, the two square waves are out of phase, and the direction of rotation of the motor determines which square wave leads in phase.

Digital servo control 12 compares the commanded motion and actual motion signals, and produces a signal for driving motor 14 which tends to make the error between the commanded and actual motion signals vanish. Digital servo control 12 will be described more fully hereinafter.

Power driver 13 includes all of the equipment necessary to condition the signal from digital servo control 12 for application to motor 14. This includes an amplifier to supply the necessary power to drive motor 14, as well as circuits to compensate for frequency response and transient response, in order to assure stability of the system.

Motor 14 may be any conventional form of electric motor, the speed of which may be controlled by varying an applied voltage. The motor is mechanically coupled to both load 15 and transducer 11 and imparts motion to them on activation.

Referring now to FIG. 1B, there is shown another embodiment of the invention for controlling the position and motion of a load 15. The system broadly comprises machine position director 10, which is identical to the corresponding element in FIG. 1A; digital servo control 19, which is a network jointly responsive to the commanded motion signal received on lead 16 from position director 10 and an actual motion signal received on lead 17', to control a stepping motor 14' through a pulse conditioner 20, which in turn moves load 15 by a predetermined amount. A transducer is not required because the pulses from digital servo control 19, which controls the movement of load 15, are in a form which can be fed back directly to the input of digital servo control 19.

Pulse conditioner 20 includes all of the equipment necessary to put the pulses from digital servo control 19 in a form appropriate for application to stepping motor 14'. This may include, for example, pulse amplifiers, phase encoders, and level shifters.

Incremental stepping motor 14' is an apparatus well known in the art. Motors of this type respond to an applied actuating pulse by rotating by a fixed angular increment. Thus, a stream of bi-directional pulses achieves bi-directional rotation, which can be used to move the load.

Digital servo control 19 differentially accumulates pulses received on leads 16 and 17', respectively, and produces a bi-directional pulse train on lead 245 in which the repetition rate and polarity are determined, respectively, by the magnitude and sign of the pulse accumulation. Digital servo control 19 comprises: timing source 200, which provides timing signals for controlling the system; command input synchronizer 210 coupled via lead 16 to receive the command signal from machine position director 10; positional error counter 230 coupled via lead 215 to receive the output of command input synchronizer 210, and coupled via leads 245 and 17' to receive the output of digital servo control 19; and velocity reference pulse generator 240 coupled via lead 235 to receive the output of positional error counter 230, and which provides the output of digital servo control 19 on lead 245.

In operation, command input synchronizer 210 synchronizes the pulses from machine position director 10 to timing source 200. Positional error counter 230 differentially counts the number of pulses received from synchronizer 210 and from the output of digital servo control 19 and stores a count equal to the accumulated difference. Inasmuch as the pulses represent increments of position, the accumulation of counter 230 corresponds to the positional error between commanded position (the pulse accumulation on lead 215) and actual position (the pulse accumulation on lead 17'). This positional error count controls the repetition rate and polarity of the pulse train produced by velocity reference pulse generator 240, with the magnitude of the accumulation determining repetition rate and the sign of the accumulation determining polarity. It will be appreciated that since each pulse produced on lead 245 produces a predetermined incremental movement of motor 14' and of load 15, the pulse train produced by generator 240 corresponds to the actual movement of the load, and since the pulses are synchronized to clock pulse source 200, they can be fed back as an actual motion signal, thereby eliminating the need for any transducers.

FIG. 2 is a functional block diagram showing further details of digital servo control 12 of FIG. 1A. The front end of digital servo control 12 (through generator 240) is nearly identical to digital servo control 19 of FIG. 1B, but control network 12 will be described in its entirety for clarity. Digital servo control 12 includes timing source 200 which produces, on leads 201 through 206, timing signals for controlling the remainder of the components of the system. Externally applied system reset input pulses are received on lead 208 and cause timing source 200 to reset the operation of the system.

The commanded motion signal from machine position direction 10 is applied to command input synchronizer 210 via lead 16 and produces, on lead 215, a replica of the commanded motion signal which is synchronized to timing source 200.

The actual motion signal (i.e., the two out of phase square waves) from transducer 11 is provided to encoder and synchronizer 220 via lead 17 wherein the transducer signal is encoded into a bi-directional pulse signal similar to the commanded motion signal, and is synchronized to timing source 200. The synchronized bi-directional actual motion signal is applied to positional error counter 230 via lead 225.

Positional error counter 230 accumulates the difference between the number of pulses in the commanded motion signal, appearing on lead 215, and the number of pulses in the actual motion, appearing on lead 225. It will be appreciated that the accumulation in counter 230, being an accumulation of positional increments, corresponds to the difference between the commanded position and the acutal position (i.e. it is a positional error signal).

At this point, it should be appreciated that the signals appearing on lead 245 in FIGS. 1B and 2 are identical under the same operation conditions. Encoder and synchronizer 220 is required in FIG. 2 to change the signal produced by the transducer 11 into a form usable in counter 230. This signal already had such a form in the configuration of FIG. 1B, so no additional equipment was necessary. The additional feedback loop in FIG. 2, which includes counter 250 and converter 280, is required to convert the pulse signal on lead 245 to a form (analog) useful for controlling motor 14 of FIG. 1A. The additional feedback loop also improves the control of the system.

The error accumulation of counter 230 is coupled to velocity reference generator 240 via led 235, and is effective to control the repetition rate and polarity of pulses produced by the generator 240. As a result, generator 240 produces, on lead 245, a train of pulses having a repetition rate proportional to the accumulation of counter 230 and having a polarity determined by the sign of the accumulation.

The pulse train produced by generator 240, which is an effective commanded motion signal, is applied to velocity error counter 250, via lead 245, along with the actual motion signal, which is provided from encoder and synchronizer 220 via lead 227. Velocity error counter 250 accumulates the difference between the number of pulses in the effective command signal and the actual motion signal in the same manner as counter 230 accumulated its difference, and produces a count, on lead 255, which is a new estimate of positional error. This count on lead 255 is applied to a digital-to-analog converter 260 which produces a quantized analog output signal for controlling the speed of motor 14, as previously described.

From the foregoing description, it will be appreciated that the invention contemplates a method of producing the velocity reference signal for motor 14, which method includes the steps of:

(a) differentially accumulating the pulses in the commanded motion and the actual motion (sensed motion) signals to produce a positional error signal, and (b) generation a velocity reference signal comprising a train of bi-directional pulses in which the repetition rate of the pulses is determined by the magnitude of the positional error signal, and the polarity of the pulses is determined by the sign of the positional error signal. In the particular arrangement disclosed, the method also includes the additional steps of:

(c) differentially accumulating the pulses in the velocity reference and actual motion signals to produce a second positional error signal; and (d) conditioning the second positional error signal for application to motor 14.

The various components of digital servo control 12 are made up of one or more of the conventional logic building blocks described hereafter. An inverter has a single input and a single output and performs the Boolean function of complementation, that is, the output is a logical zero or low level when the input is a logical one or high level, and vice versa. An OR gate has a plurality of inputs and a single output which is high when at least one of the inputs is high and is low otherwise. An AND gate has a plurality of inputs and a single output which is high only when all of the inputs are high.

A full binary adder performs the arithmetic addition of two one-bit binary numbers applied to inputs designated as A and B, and produces a two-bit binary output number consisting of a sum bit, S, and a carry-out bit, $C_O$. The adder also has a carry input, $C_i$, to permit carrying a bit into the addition from a previous addition, when a string of additions are performed.

A binary counter has a single clock input, C, a reset input, R, and a plurality of outputs for transmitting a stored count. The counter increments its stored count on the positive-going transitions of successive pulses applied to the clock input to produce a binary number on its outputs representative of the accumulation of clock pulses. The size of the counter and the extent of its count depend on the number of stages, usually expressed as the number of output bits. An $n$ bit counter will count repetitively (i.e., returning to zero after reaching a maximum count) from zero to a maximum count of $2^n - 1$.

An up/down counter is similar to a binary counter except that it has four inputs designated U (up), D (down), C (clock) and R (reset). The up/down counter can count in both directions, and counts up on a clock pulse when only the U input is high, down on a clock pulse when only the D input is high, and retains the previous count when the U and D inputs are the same.

Two types of storage devices are also employed. The first of these, a D flip-flop, has a data input (D), a clock input (C), a reset input (R), and a single output (Q). On the positive-going transition of the clock input signal, the Q output signal changes to the value that the D input had prior to the occurrence of the clock transition. When a low level is applied to the reset input, the Q output is immediately set to the low state regardless of any of the other inputs. A shift register has a data input D, a clock input C, a reset input R and an output Q. Essentially, it comprises a plurality of serially connected flip-flops (stages) through which input data bits are consecutively shifted on the positive-going transitions of consecutive clock pulses. In this manner an $m$ stage shift register realizes a delay of $m$ clock periods.

FIGS. 3, 4 and 5, when arranged as shown in FIG. 6, provide a logic schematic diagram of an illustrative embodiment of digital servo control 12. In this schematic diagram, the components constituting the functional blocks of FIG. 2 are enclosed in dashed boxes having the nomenclature and numerical character designation of the corresponding blocks in FIG. 2. In this illustrative embodiment, the bi-directional command input signal is actually a two-line pulse signal including on line 16A those command pulses intended to receive a positive weight (i.e., corresponding to the direction of motion defined as positive), and including on line 16B those pulses intended to receive a negative weight. In operation, when commanded motion is in the positively defined direction, pulses are produced only on line 16A, and when motion is in the negatively defined direction, pulses are produced only on line 16B. In either case, the repetition rate of the pulses represents the speed of motion in the corresponding direction. The sensed motion signal is also a two line signal, with a different one of the square waves from transducer 11 being received on each of lines 17A and 17B.

the schematic diagram is best understood by reference to the waveform diagram FIG. 7 in which all waveforms are drawn to a common time base, with time progressing to the right. The waveforms of FIG. 7 appear on the schematic diagram at points where the corresponding letters are designated.

Timing Source 200

Timing source 200 comprises: an inverter 300 which couples system reset pulses (applied to lead 208) to the entire system via lead 206; an oscillator 302 serving as a source of clock pulses (waveform A) which are provided on lead 205; a counter 304 for enumerating clock pulses; and a count decoder 306 which senses the enumeration of counter 304 via leads 305 and produces a pulse in the signals on leads 202, 203 and 204 (waveforms C, D and E) when certain predetermined counts occur.

Oscillator 302 may be any conventional form of pulse oscillator which provides pulses at a much higher repetition rate than is encountered in either the commanded motion signal or the sensed motion signal. These clock pulses serve as a time base for all digital operations in the control system.

In the illustrative embodiment, counter 304 has a five bit capacity and, therefore, repeatedly enumerates clock pulses by counting from 0 to 31 (a total of 32 counts). The instanteous count is provided in parallel, on leads 305, as a multibit binary number with the most significant or slowest changing bit (denoted MSB) appearing on the uppermost of leads 305 in FIG. 3 and bits of successively decreasing significance appearing on successively lower ones of leads 305. The most significant bit is a square wave (waveform B) having a period which is 32 times as long as a clock period, and is provided to the remainder of the control system via lead 201.

Count decoder 306 is a logic circuit of conventional design which produces a pulse on lead 202 each time the counts 8 or 24 occur (waveform C), produces a pulse on lead 203 each time the counts 15 or 31 occur (waveform D) and, produces a pulse on lead 204 each time the counts 12 through 14 or 28 through 30 occur (waveform E).

From the foregoing description and reference to FIG. 7, it will be appreciated that waveform B is the lowest frequency signal produced by timing source 200. Each cycle of waveform B (hereafter also referred to as the frame clock) defines an operating cycle or frame of digital servo control 12. Thirty two cycles of the system clock (waveform A) are included in each cycle of the frame clock and divide it into 32 sub-intervals (hereafter referred to as time slots), 16 of which occur during the first half-frame (i.e., the high portion of waveform B) and 16 of which occur during the second half-frame (i.e., the low portion of waveform B). Waveforms C and D correspond to control signals which mark the middle and end (last time slot) of each half-frame, respectively. Waveform E is a control waveform which marks the 13th, 14th and 15th time slot of each half-frame.

Command Input Synchronizer 210

The two-line commanded motion signal provided by position director 10 on leads 16A and 16B is generally asynchronous with respect to timing source 200. Inasmuch as all digital operations in the control system are controlled by timing source 200, command input synchronizer 210 is provided to synchronize the command signals to the internal timing of the control system. Synchronizer 210 broadly comprises: a pair of sensing flip-flops 310 and 315 which receive, respectively, the positive and negative command inputs, and are responsive to the occurrence of a pulse on their respective inputs during a single frame; and a pair of synchronizing flip-flop 311 and 316 which are responsive to flip-flops 310 and 315, respectively, and produce a pulse (in waveforms F and G, respectively) in the sixteenth time slot of the first half-frame (the high portion of waveform B) when the corresponding sensing flip-flop indicates that a pulse was received. The resultant effect of the cooperation between the sensing and synchronizing flip-flops is that when a pulse appears on lead 16A or 16B, a pulse is produced on lead 215A or 215B, respectively, during the next occurrence of time slot 16 of the first half-frame.

Inasmuch as synchronizing arrangements for the positive and negative command inputs are identical, only the one corresponding to the positive command input (i.e., that including flip-flops 310, 311) will be described in detail. The positive command input signal is applied via lead 16A to the C (clock) input of sensing flip-flop 310, which has its D (data) input tied to a permanent high signal. The R (reset) input to flip-flop 310 is provided from the output of flip-flop 311 via lead 312 and inverter 313. The output of flip-flop 310 is provided to the D input of flip-flop 311 which is clocked (i.e., its C input goes high) in the sixteenth time slot of each first half-frame by pulses in waveform D, provided from timing source 200 via lead 308. Flip-flop 311 is reset when a low state occurs in waveform B which is coupled to its R input via lead 309 and inverters 329 and 319.

In operation, pulses provided on lead 215A are fed back to the reset input of flip-flop 310 with inversion, and reset flip-flop 310 in the sixteenth time slot of the first half-frame. Thus, the output of flip-flop 310 is always low at the start of the second half-frame. Since the D input of flip-flop 310 is permanently high, positive-going transitions of pulses on lead 16 (the positive command signal which here serves as a clock input) will cause the output of flip-flop 310 to go high. This high signal is coupled to the D input of flip-flop 311, but the output of that flip-flop is kept low during the entire second half-frame by waveform B, its reset input; it will not go high, during the first half-frame, until a positive-going pulse transition occurs in waveform D (i.e., at the start of time slot 16). Flip-flop 311 once again goes low when waveform B, its reset input, goes low (at the end of time slot 16), so that flip-flop 311 produces a pulse in the first half-frame coincident with time slot 16. As previously explained, the pulse produced by flip-flop 311 is coupled back as a reset pulse to flip-flop 310. Resetting flip-flop 310 makes the D input to flip-flop 311 low so that the latter will not produce further pulses unless additional pulses occur on lead 16A to set flip-flop 310.

Encoder and Synchronizer 220

The dual square wave signal produced by transducer 11 on leads 17A and 17B is not in the bi-directional pulse train format of the system, and is not synchronized to timing source 200. Encoder and synchronizer 220 converts the dual square wave signal to a synchronized two-line signal in the desired format, to provide a sensed motion signal in which positive pulses appear on lead 225A (waveform H) and negative pulses appear on lead 225B (waveform I).

Encoder and synchronizer 220 comprises: encoding flip-flops 320 and 321 which convert the dual square wave signal to a two-line bi-directional pulse format; and synchronizing flip-flops 326 and 328 which synchronize the positive and negative pulses, respectively, to the sixteenth time slot of the second half-frame (it will be recalled that the pulses of the commanded motion signal were synchronized to the sixteenth time slot of the first half-frame).

Flip-flop 320 is clocked on the positive-going transitions of the square wave on lead 17B, and the square wave received on lead 17A is applied to the D input. Thus, flip-flop 320, on a positive-going transition on lead 17B, assumes the state of the signal on lead 17A. If the signal on lead 17A leads in phase with respect to the signal on lead 17B, it will already be high when the positive-going transition occurs, so the output of flip-flop 320 goes high. On the other hand, if the signal on lead 17A lags in phase with respect to the signal on lead 17B, the former signal will still be low when a positive-going transition occurs in the latter signal, so the output of flip-flop 320 stays low. In the illustrative embodiment, a high at the output of flip-flop 320 (i.e., indicating that the signal on lead 17A leads in phase with respect to the one on lead 17B) is transmitted as a high to flip-flop 326 via lead 322 and ultimately results in the production of a pulse on lead 225A (waveform H).

Inasmuch as the signal on lead 17B is coupled to the C input of flip-flop 321 through inverter 325, the flip-flop is clocked on the negative-going transitions of the square wave on lead 17B, which become positive-going transitions at the output of inverter 325. The square wave received on lead 17A is applied to the D input of flip-flop 321. Thus, flip-flop 321, on a negative-going transition on lead 17B, assumes the state of the signal on lead 17A. If the signal on lead 17A lags in phase with respect to the signal on lead 17B, it will remain high when the negative-going transition occurs on lead 17B so the output of flip-flop 321 will go high. On the other hand, if the signal on lead 17A leads in phase with respect to the signal on lead 17B, the former signal will already be low when a negative-going transition occurs in the latter signal, so the output of flip-flop 321 stays low. In the illustrative embodiment, a high at the output of flip-flop 321 is transmitted as a high to flip-flop 328 via lead 324 and ultimately results in the production of a pulse on lead 225B (waveform I).

Clearly, flip-flops 320 and 321 operate in a similar manner except that the former produces a high output only when the signal on lead 17A leads in phase with respect to the one on lead 17B, whereas the latter flip-flop produces a high output only when the signal on lead 17A lags in phase.

Flip-flops 326 and 328 operate similarly to synchronizing flip-flops 311 and 316 of command input synchronizer 210. The only distinction is that they are reset with an inverted version of waveform B (i.e., this waveform is coupled to them through inverter 329), so that the flip-flops are reset during the first half-frame and, therefore, produce pulses synchronized to the 16th time slot in the second half-frame.

Pulses on leads 225A and 225B (waveforms H and I, respectively) are coupled to OR gate 332 via leads 327 and 330, respectively, so that OR gate 332 produces a pulse whenever a pulse occurs on either of leads 225A or 225B. The pulses from OR gate 332 are coupled to the reset input of flip-flops 320 and 321 via inverter 334 and are effective to reset the flip-flops, thereby guaranteeing that the outputs of flip-flops 320 and 321 are low at the beginning of every occurrence of the first half-frame.

Positional Error Counter 230

Positional error counter 230 functions as a binary up/down counter which serially accumulates the difference between the number of pulses in the bi-directional commanded motion signal on leads 215A and 215B (waveforms F and G) and the bi-directional actual motion signal on leads 225A and 225B (waveforms H and I). In order to accumulate the difference between these pulse signals, positive commanded motion pulses appearing on lead 215A (waveform F) and negative actual motion pulses appearing on lead 225B (waveform I) are counted up (positively), whereas negative commanded motion pulses appearing on lead 215B (waveform G) and positive actual motion pulses appearing on lead 225A (waveform H) are counted down (negatively). The maximum counting capacity is 9 bits plus 1 bit for sign, and negative accumulations are represented by the two's complement of the positive magnitude of the accumulation (the two's complement of a binary number is that quantity which produces zero when added to the original number).

Positional error counter 230 broadly comprises: shift register 400, which stores and, during each half-frame, recirculates the positional error count; full adder 408, which is in the recirculation path of shift register 400 and updates the positional error count by adding thereto or substracting therefrom during shift register recirculations (i.e., during each half-frame); flip-flop 420 which cooperates with full adder 408 to provide carry bits from one bit position of the error count to the next, during additions or subtractions; and flip-flop 416 which functions as an add/subtract control for full adder 408.

Waveforms G and H are coupled to OR gate 428 via leads 215B and 225A, respectively, and OR gate 428 provides the D input to flip-flop 416. This flip-flop is clocked with an inverted version of waveform D, coupled to its C input via leads 203 and 430, inverter 432, and lead 434. The Q output of flip-flop 416 is coupled to the B input or full adder 408 via lead 418.

Waveforms F and I are coupled to OR gate 442 via leads 215A and 225B, respectively, and the output of OR gate 442 is provided to OR gates 426 and 438. OR gate 426 further receives the carry output ($C_o$) of full adder 408 via lead 424, and provides the D input to flip-flop 420, which is clocked with clock pulses (waveform A) coupled to its C input via leads 205, 404, and 405. OR gate 438 further receives an inverted version of waveform D via leads 203 and 430, inverter 432, and lead 436, and provides its output to AND gate 440. AND gate 440 also receives the system reset signal via leads 206 and 406, and provides its output to the R input of flip-flop 420. The Q output of flip-flop 420 is coupled to the carry-in input ($C_i$) of full adder 408 via lead 422.

The positional error count (waveform J) is provided in serial form, on lead 235A, from the least significant bit position of shift register 400, and the signal from the next to least significant bit position is provided on lead 235B. Waveform J is also provided as the A input to full adder 408 via leads 235A and 414. The D input to shift register 400 is fed back from the sum output (S) of full adder 408, and the shift register is clocked by system clock pulses (waveform A) coupled to its C input via leads 205 and 404. The shift register is reset to the all zeros condition by system reset pulses coupled to its R input via leads 206 and 406.

In operation, shift register 400 is continuously shifting in successive time slots. In the illustrative embodiment, the shift register includes sixteen stages, so that in the course of a half-frame the entire positional error count is shifted, in serial form, onto lead 235A, and an updated positional error count is shifted back into register 400 via lead 410.

The relationship between the count produced on lead 235A and the count received on lead 410 during any half-frame depends on the state (high or low) of the waveforms F, G, H and I during the 16th time slot of the previous half-frame. If there are no pulses present in any of waveforms F, G, H or I during time slot 16 in the previous half-frame, the outputs of OR gates 428 and 442 are both low. Also, the signal on lead 436 is low, because of the presence there of the pulse in inverted waveform D. Thus, both inputs to OR gate 438 are low, and a low level is coupled to the R input of flip-flop 420 through AND gate 440, thereby resetting flip-flop 420. The low level at the output of OR gate 428 (the D input for flip-flop 416), causes the output of flip-flop 416 to go low at the end of time slot 16 (the time of occurence of the positive transition in the inverted pulse clocking flip-flop 416 via lead 434). Thus, when the new half-frame begins, the outputs of flip-flops 416 and 420 are both low. As a result, the B and $C_i$ inputs to full adder 408 are both low, so the bits of the positional error count appearing on lead 235A all have zero added to them and are fed back unchanged to shift register 400.

If during the sixteenth time slot of the preceding half-frame, a pulse occurs in either of waveforms G or H, OR gate 428 provides a high level at the D input to flip-flop 416. Thus, at the end of time slot 16, when the C input to the flip-flop experiences a positive transition, the output of the flip-flop goes and remains high, providing a high level at the B input of full adder 408. In the absence of pulses in waveforms F and I, flip-flop 420 is reset in the sixteenth time slot, as previously explained, and the $C_i$ input to full adder 408 goes low. With a high at the B input and a low at the $C_i$ input of full adder 408, a one is added to the first bit provided at the A input, and the new sum bit produced at the S output is fed back to shift register 400. The output bit produced at the $C_o$ output of full adder 408 is coupled to the D input of flip-flop 420 through OR gate 426 and is transferred to the Q output at the start of the second time slot. The $C_o$ output from full adder 408 is thereby delayed by one time slot, and, by being applied to the $C_i$ input of full adder 408, is added to the next significant bit position in the positional error count. In the above-described manner, each bit in shift register 400 is, in turn, shifted into full adder 408 and a one from flip-flop 416 is added thereto. The result is that the binary number 11. . . 11 is added to the positional error count as it is re-entered into shift register 400. Inasmuch as the binary number 11. . . 11 is the two's complement of one (0, 0. . . 0, 1), a one has effectively been subtracted from the positional error count. Thus, the occurrence of a negative pulse (i.e., a pulse in waveforms G or H) causes the positional error count to be decreased by one.

If, during the 16th time slot of the preceding half-frame, a pulse occurs in either of waveforms F or I, the output of the OR gate 442 goes high, and this high level is transmitted to the D input of flip-flop 420 through OR gate 426 and to the input of AND gate 440 through OR gate 438. In the absence of a system reset pulse, both inputs to AND gate 440 are high and flip-flop 420 is not reset. In addition, the high level provided at the D input of flip-flop 420 causes its output to go high at the beginning of the first time slot, so that a high level, representing an initial carry input of one is applied to the $C_i$ input of full adder 408. In the absence of pulses in either of waveforms G or H, the output of OR gate 428 is low and, at the end of the sixteenth time slot, the output of flip-flop 416 is reset and remains low. Thus, the first bit of the positional error count has added to it the zero applied to the B input of full adder 408 and the one applied to the $C_i$ input. As previously explained, the addition proceds with the S bit being fed back to shift register 400 and the $C_o$ bit being added to the next significant position of the positional error count. It should be noted that after the first bit, flip-flop 416 continues to produce zeros, and flip-flop 420 serves merely as a one time slot delay for carry bits. Consequently, the only effect of the occurrence of a positive pulse is to add a binary one (00 . . . 01) to the positional error count. Thus positive pulses cause the positional error count to be incremented by one.

It should be noted that, inasmuch as the commanded motion and actual motion pulses are relegated to different half-frames by the action of command input synchronizer 210 and encoder and synchronizer 220, commanded motion and actual motion pulses must occur in different half-frames and never simultaneously. It will, therefore, be appreciated that positional error counter 230 functions as an up/down counter, counting up one for each positive pulse and down one for each negative pulse.

In counter 230, the positional error is represented by ten bits with negative quantities being represented in two's complement form, so that error counts from minus 512 to plus 511 can be represented. Although there are only ten significant counter bits, a 16 bit shift register 400 was used because shift registers of this size are readily commercially available, and because of the convenience of dividing each half-frame into sixteen time slots. In the illustrative embodiment, the six additional bit positions of shift register 400 are not used.

Referring now to waveform J of FIG. 7, there is represented the time sequence of bits appearing on lead 235A, which is a serial representation of the accumulation of counter 230. The first nine bits produced in each half-frame, for example those bits represented by dashed pulse 444, represent the accumulation of counter 230, with the most significant bit, for example 446, representing the sign of the accumulation. The last six bits produced in each half-frame are "don't care" bits and are represented by a zero level. The signal represented by waveform J is provided to velocity reference pulse generator 240 via lead 235A.

Velocity Reference Pulse Generator 240

Velocity reference pulse generator 240 broadly comprises a serial accumulator 450 and an overflow detector 452. During each half-frame, accumulator 450 receives the positional error count via lead 235A and serially adds it to the accumulation of previous error counts. Accumulator 450 has a limited count capacity, so that it experiences frequent overflows, which can be either positive (i.e., resulting from an accumulation of positive error counts which cause the accumulator to exceed its capacity) or negative (i.e., resulting from an accumulation of negative error counts which cause the accumulator to exceed its capacity). Overflow detector 452 is responsively coupled to accumulator 450 via lead 454, and senses the sign of the positional error count via lead 235B, to produce a pulse on lead 245A when a positive overflow occurs, and on lead 245B when a negative overflow occurs.

Accumulator 450 is, basically, a cumulative serial adder similar to the one used in counter 230. Shift register 460 contains the running cumulative summation of positional error counts, which is shifted into the A input of full adder 462 via lead 464, under control of successive clock pulses (waveform A) applied to shift register 460 via lead 205. Added to this shift register signal is the signal (waveform K) applied to the B input of adder 462 via lead 466. This signal (waveform K) is a composite of the positional error count (waveform J) applied to OR gate 468 via lead 235A, and waveform D (a series of pulses corresponding with time slot 16) which is applied to OR gate 468 via leads 203 and 470. The carry input to adder 462 is provided from the Q output of flip-flop 472 via lead 474. In each time slot, flip-flop 472 receives carry out bits from adder 462 via lead 476, and, under control of clock pulses (waveform A) applied to the C input of flip-flop 472 via leads 205 and 477, applies these bits to the carry input of adder 462 in the succeeding time slot. Waveform E, applied to the R input of flip-flop 472 via leads 204 and 478 and through inverter 480, serves to reset flip-flop 472 during each half frame, after an addition has taken place.

The combination of waveforms D and J in OR gate 468 produces a composite error count (see waveform K in FIG. 7) having 10 bits, in which the least significant bit (e.g., 479 in FIG. 7) occurs in time slot 16 and is always a one, and the remaining 9 bits, which are identical to waveform J, occur during the next 9 succeeding time slots. The purpose of introducing bit 479 will be discussed more fully hereinafter.

Beginning with time slot 16, progressively higher order bits of the composite error count and the contents of shift register 460 are added in succeeding time slots. In each time slot, a sum bit (waveform L) is produced at the S output of adder 462 and fed back to the input of shift register 460 via lead 463, and a carry output bit is provided at the $C_o$ output of adder 462 (waveform M) and is fed back to the D input of flip-flop 472. This flip-flop provides the bit for the carry input of adder 462 during the succeeding time slot (i.e., the carry bit is added to the next higher order bits present at the A and B inputs, as would be done in a manual addition).

Overflow detector 452 comprises inverters 482 and 484, AND gates 486 and 488, and flip-flops 490 and 492. AND gate 486 is coupled to the second bit output position of shift register 400 via lead 235B and inverter 482, and to carry output (waveform M) of adder 462 via lead 454. The output of AND gate 486 is provided as the D input to flip-flop 490. Flip-flop 490 is clocked in the ninth time slot of each half-frame by the pulses in waveform C, which are coupled to the C input of flip-flop 490 via lead 202 and through inverter 491. The Q output of flip-flop 490 (waveform N) is provided on lead 245A. AND gate 488 is coupled to the second bit output of shift register 400 via leads 235B and 494, and to the $C_o$ output of adder 462 (waveform M) via lead 454 and inverter 484. The output of AND gate 488 is coupled to the D input of flip-flop 492 which is clocked in the ninth time slot of each half-frame by the pulses in waveform C, coupled to the C input of flip-flop 492 via leads 202 and 496 and inverter 491. The signal at the Q output of flip-flop 492 (waveform O) appears on lead 245B. Inasmuch as flip-flops 490 and 492 are both controlled by the waveform C, which is applied to their C inputs, their stored content can be changed only in the ninth time slot, that is, only when a pulse appears in waveform C. Since these pulses are applied through inverter 491, the trailing pulse transition is the positive-going one, and the flip-flops change state at the end of the ninth time slot. Flip-flops 490 and 492 are both reset by the pulses in waveform E which are coupled to their R inputs via leads 204 and 483 and through inverter 485. As a result, the output signals of these flip-flops (waveform N and O, respectively) go low simultaneously with the leading transition of each pulse in waveform E.

In the ninth time slot, adder 462 produces the most significant bit of the number stored in accumulator 450, so that the value of the $C_o$ output (waveform M) produced on lead 454 at this time is indicative of the overflow condition of the accumulator, as will be more fully explained hereinafter. In the same time slot, the bit appearing on 235A (waveform J) is the most significant bit of the positional error count, so that the bit appearing on lead 235B (i.e., the next bit to appear on lead 235A) is the sign bit of the positional error count. This sign bit is high for a negative count and low for a positive count. Flip-flop 490 produces a high level on lead 245A (e.g., pulse 485 in waveform N) and retains this level through the next occurrence of a pulse in waveform E when the bit on lead 235B is low (a positive error count) and the bit on lead 454 is high (e.g., 487 in waveform M). This is clearly a positive overflow condition because a positive positional error count has been added and a carry out has been produced from the most significant bit position. Flip-flop 492 produces a high level on lead 245B (e.g., pulse 489 in waveform O), and maintains it through the next occurrence of a pulse in waveform E, when the bit on lead 235B is high (a negative error count) and the bit on lead 454 is low (e.g., 491 in waveform M). This is a negative overflow condition because two negative numbers in two's complement form, as here, are expected to produce a most significant carry output bit when added together, and will fail to do so only when an overflow is produced.

From the foregoing description, it will be appreciated that the repetition rate of pulse produced on leads 245A or 245B (waveforms N and O respectively) will depend directly on the magnitude of the positional error count produced by counter 230, since more frequent overflows occur as numbers of higher magnitude are accumulated. The insertion of pulses (for example, pulse 479 in waveform K) in the least significant bit position of accumulator 450 assures that the repetition rate of pulses produced by generator 240 will never go down to zero. When the positional error count is zero (i.e., the servo system has brought machine to the desired position), generator 240 continues to produce pulses at a very low rate, as a result of accumulating the inserted pulses, and this keeps the device under control oscillating about its commanded position with very low frequency and minute amplitude.

Velocity Error Counter 250

Like positional error counter 230, velocity error counter 250 accumulates the difference between the number of pulses in a commanded motion signal and in an actual motion signal. The effective commanded motion signal is the signal produced by generator 240 on leads 245A and 245B (waveforms N and O, respectively), and the actual motion signal is the bi-directional pulse signal (waveforms H and I) coupled from encoder and synchronizer 220 via leads 227A and 227B. The transducer 11 may be incapable of producing a signal with the equivalent resolution of generator 240, so counter 250 counts pulses in two levels, to permit simultaneous processing of high and low resolution signals. Pulses received via leads 245A and 245B are counted with the equivalent of ten bits of resolution (actually nine bits because the 10th bit denotes the sign) by counting three bits in a first level up/down counter 500 which overflows into a second level up/down counter 502, wherein an additional seven bits are counted. Pulses received on leads 227A and 227B (waveforms H and I)

are counted with a resolution of only seven bits by being coupled directly into up/down counter 502 without being counted in up/down counter 500.

Referring now to FIG. 5, pulses received on leads 245A and 245B (waveforms N and O in FIG. 7) are coupled, respectively, to AND gates 504 and 506. AND gates 504 also receives the upper limit disable output of limit decoder 508 via lead 510, and AND gate 506 receives the lower limit disable output of limit decoder 508 via 512. AND gate 504 provides the U input to up/down counter 500 which is also provided to one input of AND gate 532 via lead 516, and AND gate 506 provides the D input to counter 500 which is also provided to one input of AND gate 534 via lead 518.

OR gate 520, inverter 522, OR gate 524 and AND gate 526 cooperate to produce a signal (waveform P) for clocking counters 500 and 502, which signal is coupled to the C input of counter 500 via lead 514 and to the C input of counter 502 via leads 514 and 552. The signals on leads 245A and 245B are coupled to the inputs of OR gate 520 via leads 521A and 521B, respectively, so that the output of OR gate 520 includes a pulse whenever a pulse is present in either of waveforms N or O. The output of OR gate 520 is coupled to an input of OR gate 524 through inverter 522, and waveform E is provided via lead 204 as a second input to OR gate 524. The output of OR gate 524 is coupled to one input of AND gate 526, and an inverted version of waveform D is provided to the other input of AND gate 526 via lead 203, inverter 528 and lead 530. The resulting signal at the output of AND gate 526 (waveform P) is normally high and includes a negatively directed pulse each time a pulse is present in any of waveforms D, N and O. Inasmuch as counters 500 and 502 are clocked on positive-going transitions in waveform P, (i.e. the trailing transitions of pulses in that waveform) these counters are incremented only during the trailing transitions of pulses in waveforms D, N and O.

The system reset signal is coupled to the R input of counter 500 via leads 206 and 531 and to the R input of counter 502 via lead 206, and is effective to reset the counter to the all zeros count.

The output bits of counter 500 are produced on the uppermost three of leads 255, which are applied to digital-to-analog converter 260. These output bits are also coupled to three inputs of AND gate 532 via leads 533 and to three inputs of AND gate 534 via leads 533 and through inverter 535A, 535B and 535C.

AND gates 538 and 536 receive waveforms H and I, respectively, via leads 227A and 227B. In addition, AND gate 536 receives the upper disable output of limit decoder 508 via lead 510 and AND gate 538 receives the lower disable output of limit decoder 508 via lead 512.

The outputs of AND gates 532 and 536 are coupled via leads 540 and 542, respectively, to OR gates 544, and therethrough to the U input of up/down counter 502. The outputs of AND gates 534 and 538 are coupled via leads 546 and 548, respectively, to OR gate 550, and therethrough to the D input of up/down counter 502. As previously explained, counter 502 is clocked with waveform P and is reset with the system reset. The seven output bits of up/down counter 502 are coupled to digital-to-analog converter 260 via the lowermost seven of leads 255, with the most significant bit (the lowermost) being coupled through inverter 554. The four most significant bits of counter 502 are, additionally, coupled to limit decoder 508 via leads 556, 558, 560 and 562, respectively.

In operation, up/down counter 500 counts on positive-going transitions of pulses in waveform P, which is coupled to its C input, and the outputs of AND gates 504 and 506 merely determine whether counter 500 counts up, down or maintains its current count. When the signal on lead 245A is high and the upper disable output of limit decoder 508 is high (absence of disable), the output of AND gate 504 is high, and counter 500 counts up on the positive-going (trailing) transition of a pulse is received at its C input. Similarly, when the signal on lead 245B is high and the lower limit disable of limit decoder 508 is high, the output of AND gate 506 is high and counter 500 counts down. In the illustrative embodiment, the signals on leads 245A and 245B cannot be high simultaneously, so that the outputs of AND gate 504 and 506 will not be high simultaneously. When the signal on neither of leads 245A and 245B is high, the count is unchanged.

From the foregoing, it will be appreciated that counter 500 can only change its count on the positive-going transitions of the wide pulses in waveform P, since both waveforms N and O, which control up and down counting, are always low during the narrow pulses.

AND gates 532 and 534 detect when counter 500 experiences positive and negative overflows, respectively, and their outputs control counter 502 to produce an up count for a positive overflow and a down count for a negative overflow. When counter 500 reaches its highest count, the signals on leads 533 are all high. A positive overflow then results if a pulse occurs in waveform N, indicating a further up count. Under these circumstances, all of the inputs to AND gate 532 are high and it applies a high signal to the U input of counter 502 (through OR gate 544). Thus, on the next positive-going transition in waveform P, counter 500 increments and returns to the all zeros state, and counter 502 increments by one. A negative overflow results when counter 500 is at its lowest count (all zeros) and a pulse occurs in waveform O to indicate a further down count. With counter 500 in the all zeros state, inverters 535A, 535B and 535C provide high signals to the inputs of AND gate 534. When waveform O goes high, all of the inputs to AND gate 534 are high and it applies a high signal to the D input of counter 502 (through OR gate 550). Thus, on the next positive-going transition in waveform P, counter 500 counts negatively and goes to the all ones state, and counter 502 counts down. From the above description it will be appreciated that changes in the count of counter 502 due to overflows from counter 500 always occur on positive-going transitions of the wide pulses in waveform P, since the waveforms N and O, which control the counting, are both low thereafter.

The signals on leads 227B and 227A (waveforms I and H) are applied, respectively, to the U input (through OR gate 544) and the D input (through OR gate 550) of counter 502 to control counting thereof. Waveforms H and I are normally low, and have pulses (i.e. they are high) only during the sixteenth time slot, so they will cause a change in the count of counter 502 only on the positive-going transitions of the narrow pulses in waveform P. Inasmuch as overflows from counter 500 can change the count of counter 502 only on positive-going transitions of the wide pulses in waveform P, overflows from counter 500 cannot interfere with changes in the count of counter 502 produced by waveforms H and I. Positive and negative overflows from counter 500 produce increments and decrements, respectively, in counter 502. However, positive pulses (waveforms H) and negative pulses (waveform I) in the actual motion signal result in decrements and increments, respectively, in counter 502, so that pulses in the actual motion signal comprising waveforms H and I are accumulated oppositely to overflow pulses from counter 500. The overall effect,, as in positional error counter 230, is to accumulate the difference between the number of overflow pulses from counter 500 and the number of pulses produced by encoder and synchronizer 220, with positive overflow and waveform I pulses being given a positive weight and negative overflow and waveform H pulses being given a negative weight.

Limit decoder 508 senses the four most significant output bits of up/down counter 502 to decode when the most negative and most positive limits of the counter's capacity are being approached. When the most positive limit of the counter's capacity is being approached (e.g., the count 0111 is detected on leads 562, 560, 558 and 556 respectively), the decoder produces a low output at its upper limit disable output to disable AND gates 504 and 536, thereby preventing further up-counting of counters 500 and 502. When decoder 508 detects that the negative limit of the count of counter 502 is being approached (e.g., a count of 1000 is detected on leads 562, 560, 558 and 556 respectively), a low level is produced on the lower disable output of limit decoder 508, and AND gates 506 and 538 are disabled to prevent further down-counting of counters 500 and 502. By so disabling counting when the limits of counter 502 are being approached, limit decoder 508 prevents discontinuities in the output of digital-to-analog converter 260 which would result from counter 502 overflowing, either positively or negatively, and recycling through one of its extreme counts.

The functional block diagram of FIG. 8 illustrates a multiple coordinate (n coordinates) control system incorporating objects and features of the invention, and should be compared to the block diagram of FIG. 1A, representing a single coordinate control system. Load 15' of FIG. 8 is similar to load 15 of FIG. 1A, except that it is arranged for movement along a plurality of coordinates, for example, movement along X, Y and Z axes and, in the case of the machine with a rotating member, movement about a rotational axis. Machine position director 10' is similar to the machine position director 10 of FIG. 1 except that it produces a plurality of commanded motion signals on leads 16-1, 16-2 . . . 16-n, each of which controls movement along a different coordinate by operating one of the control subsystems 80-1, 80-2 . . . 80-n, which are each dedicated to controlling motion along a different coordinate.

The control subsystem 80-1, 80-2 . . . 80-n are identical. Therefore, only control subsystem 80-1 will be described in detail. Control subsystem 80-1 is similar to the control system of FIG. 1A in both structure and operation, and identical elements are identified by the same reference characters as used in FIG. 1A. The primary difference between control subsystem 80-1 and the control system shown in FIG. 1 is that digital servo control 12 of FIG. 1A is replaced by digital servo control 12', which is identical to the digital servo control 12 as shown in FIGS. 2-5 except that it does not include timing source 200, but rather has a single timing source 200 which is provided to all of the control subsystems. The operation of all control subsystems from a single timing source not only saves equipment, but results in all signals within each of digital servo controls 12' being referenced to a single clock pulse source. From the foregoing detailed description of digital servo control 12, it will be appreciated that the ultimate control signal for motor 14, and therefore the actual motion imparted to the load, depends only on the rate of the various pulse signals and the accumulation of pulses. Inasmuch as the signals in each of digital servo controls 12' are all referenced to a single clock pulse source, all pulse rates therein and accumulations of pulses will be consistent and the drive signals produced by the various control loops are automatically mutually calibrated.

Although specific embodiments of the invention have been disclosed for illustrative purposes, it will be appreciated by one skilled in the art that various additions, substitutions, and modifications are possible without departing from the scope and spirit of the invention. For example, if incremental stepping motors are used in FIG. 8 instead of the motors 14, each of the control subsystems 80-1 . . . 80-n could be configured as in FIG. 1B, instead of as in FIG. 1A.

What is claimed is:

1. A control network for use in a system for controlling the movement of a device, said control system including means for moving said device, a source of a command signal representing desired movement of the device, a source of a sensed signal representing the actual movement of said device, said command and sensed signals being pulse trains in which each pulse represents an incremental displacement of said device, so that the speed of movement is encoded in the repetition rate of the pulses, said network comprising; timing pulse generator means includng a single clock pulse source operative to produce timing signals having particular repetition rates defined by said clock pulse source, respectively, for controlling operations to be performed by said network, first counter means coupled to said command signal source and said sensed signal source for producing a first positional error signal functionally related to the difference between the desired and actual positions of said device, reference generator means coupled to said timing generator means and said first counter means for generating a reference pulse signal in response to both said timing signals and said first positional error signal, said reference pulse signal having a repetition rate functionally related only to the magnitude of said first positional error signal, and output means coupled to said reference generator means for applying an output signal corresponding to said reference pulse signal to said device moving means.

2. A control network according to claim 1 wherein said command and sensed signals are each bi-directional pulse trains wherein the directions of said desired and said actual movements are encoded in the polarity of said pulse trains, respectively, and said first counter means is a bi-directional counter arranged to count positively in response to pulses in one of said command and sensed signals and to count negatively in response to pulses in the other of said command and sensed signals, the accumulated count of said counter corresponding to said first positional error signal.

3. A control network according to claim 1 wherein said reference generator means includes; means for cumulatively adding successive values of said positional error signal to produce a running sum thereof, and means for detecting overflows from said cumulative adding means, said detecting means producing a positive pulse in response to a positive overflow and a negative pulse in response to a negative overflow.

4. A control network according to claim 1 wherein said output means includes; second counter means responsive to said reference pulse signal and said sensed signal, for producing a second positional error signal functionally related only to the accumulated difference between the number of pulses in said reference pulse signal and said sensed signal, respectively.

5. A control network according to claim 4 wherein said second counter means is a bi-directional counter arranged to count positively in response to pulses in one of said reference pulse and sensed signals and to count negatively in response to pulses in the other of said reference pulse and sensed signals, and said output means further includes means for converting the accumulated count of said counter to said output signal.

6. A control network according to claim 4 wherein said second counter means includes; a first bi-directional counter arranged to count positively when said reference pulse signal has a first polarity and to count negatively when said reference pulse signal has the opposite polarity, said first bi-directional counter including means for producing positive and negative overflow pulses in response to positive and negative overflows thereof, and a second bi-directional counter coupled to said sensed signal source arranged to count oppositely for said overflow pulses and pulses in said sensed signal having the same polarity.

7. In a multiple coordinate system for controlling movements of a device, said system including means for moving the device through a plurality of coordinates, means for providing a plurality of command signals each representing desired movement of the device along one of said coordinates, and means for providing a plurality of sensed signals each representing actual movement of the device along one of said coordinates, each of said command and sensed signals being a pulse train in which each pulse represents an incremental displacement of said device, so that the speed of movement in the corresponding coordinate is encoded in the repetition rate of the pulses, the improvement comprising: timing pulse generator means including a single clock pulse source, operative to produce timing signals having particular repetition rates defined by said clock pulse source, respectively, for controlling operations to be performed by said system, and a plurality of control subsystems each dedicated to regulating movement of said device under control along one of said coordinates, each of said subsystems including; first counter means coupled to said command signal source and said sensed signal source for producing a first positional error signal functionally related to the difference between the desired and actual positions of said device along said one coordinate, reference generator means coupled to said timing generator means and said first counter means for generating a bi-directional reference pulse signal in response to both said timing signals and said first positional error signal, said reference pulse signal having a pulse repetition rate functionally related only to the magnitude of said first positional error signal, and output means coupled to said reference generator means for applying an output signal corresponding to said reference pulse signal to said device moving means for controlling the movement of said device along one of said coordinates.

8. A system according to claim 7 wherein each of said first counter means is a bi-directional counter arranged to count in opposite directions in response to the same polarity pulses in the command and sensed signals for a particular one of said coordinates, the accumulated count of said counter corresponding to the first positional error signal for the corresponding coordinate.

9. A system according to claim 7 wherein each of said reference generator means includes; means for cumulatively adding successive values of the corresponding first positional error signal to produce a running sum thereof, and means for detecting overflows from said cumulative adding means, said detecting means producing a positive pulse in response to a positive overflow and a negative pulse in response to a negative overflow.

10. A system according to claim 7 wherein each of said output means includes; second counter means responsive to the corresponding reference pulse signal and sensed signal, for producing a second positional error signal functionally related only to the accumulated difference between the number of pulses in said reference pulse signal and said sensed signal, respectively.

11. A system according to claim 10 wherein each of said second counter means is a bi-directional counter arranged to count in opposite directions in response to pulses of the same polarity in the reference pulse and sensed signals for the corresponding coordinate, and said means further includes means for converting the accumulated count of said counter to said output signal.

12. A system according to claim 10 wherein each of said second counter means includes; a first bi-directional counter arranged to count positively when the corresponding reference pulse signal has a first polarity and to count negatively when said reference pulse signal has the opposite polarity, said first bi-directional counter including means for producing positive and negative overflow pulses in response to positive and negative overflows thereof, and a second bi-directional counter coupled to the corresponding sensed signal source arranged to count oppositely for said overflow pulses and pulses in said sensed signal having the same polarity for the corresponding coordinate.

13. A control network for use in a system for controlling the movement of a device, said control system including means for moving said device, a source of a command signal representing desired movement of the device, a source of a sensed signal representing the actual movement of said device, said command and sensed signals being pulse trains in which each pulse represents an incremental displacement of said device, so that the speed of movement is encoded in the repetition rate of the pulses, said network comprising; timing pulse generator means including a single clock pulse source operative to produce timing signals having particular repetition rates defined by said clock pulse source, respectively, for controlling operations to be performed by said network, first counter means coupled to said command signal source and said sensed signal source for producing a first positional error signal functionally related to the difference between the desired and actual positions of said device, reference generator means coupled to said timing generator means and said first counter means for generating a reference pulse signal in response to both said timing signals and said first positional error signal, said reference pulse signal having a repetition rate functionally related only to the magnitude of said first positional error signal, second counter means coupled to said reference generator means and said sensed signal source for producing a second positional error signal functionally related only to the accumulated difference between the number of pulses in said reference pulse signal and said sensed signal, respectively, and drive means coupled to said second counter means for applying a signal functionally related to said second positional error signal to said device moving means for energizing said device moving means.

14. A control network according to claim 13 wherein said drive means provides an analog signal for energizing said device moving means.

* * * * *